June 13, 1950     H. M. MARTIN     2,511,674
DYNAMOMETER
Filed April 7, 1944
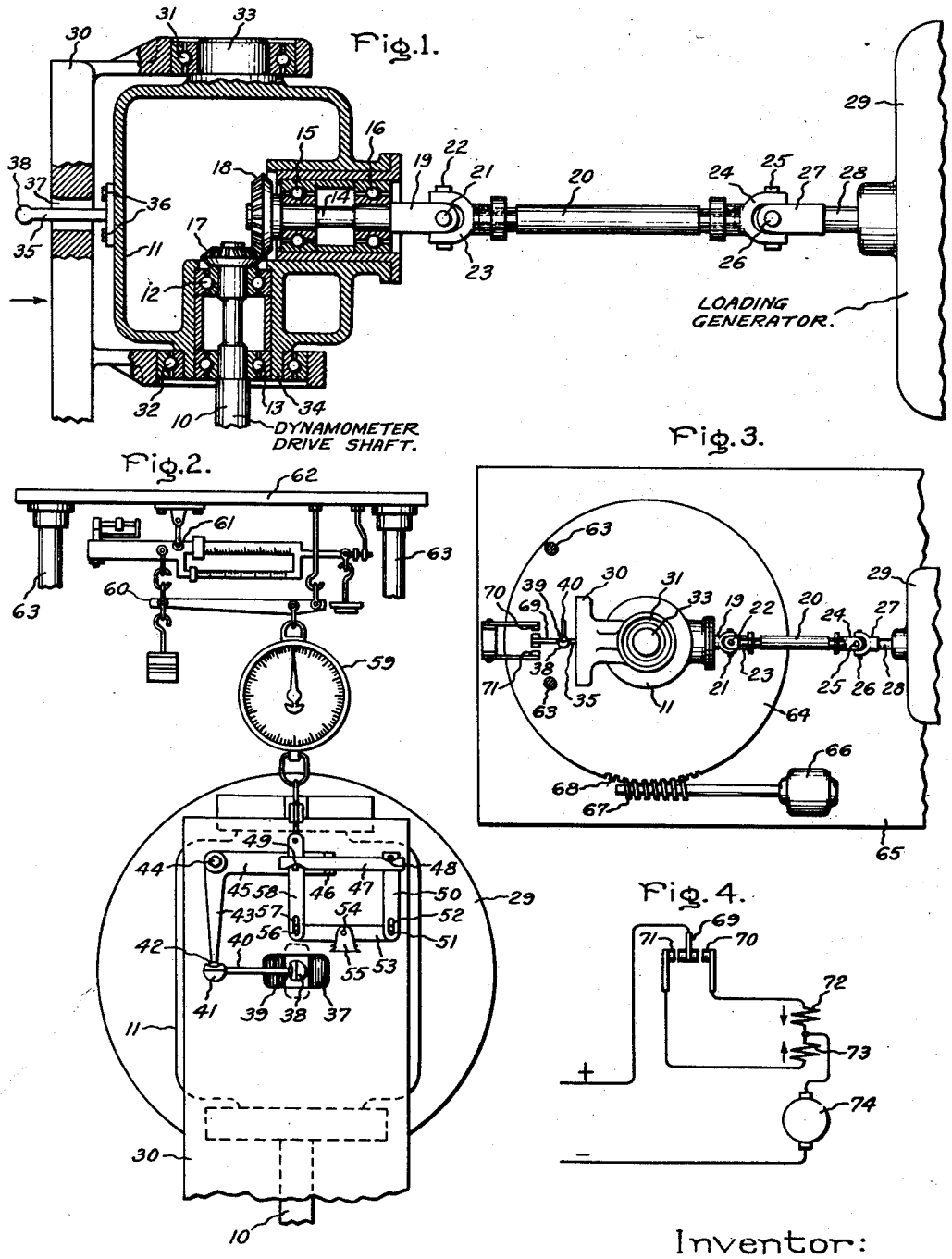
Inventor:
Harold M. Martin,
by Harry E. Dunham
His Attorney.

Patented June 13, 1950

2,511,674

UNITED STATES PATENT OFFICE 2,511,674

DYNAMOMETER

Harold M. Martin, Schenectady, N. Y., assignor to General Electric Company, a corporation of New York Application April 7, 1944, Serial No. 530,027

14 Claims. (Cl. 73—136)

My invention relates to improvements in dynamometers and more particularly to a dynamometer adapted to measure or indicate the torque of a machine having a vertically extending shaft. However, the advantages inherent in my invention apply equally to horizontal operation.

This application is a continuation-in-part of my abandoned patent application Serial No. 456,878, filed September 1, 1942, and assigned to the assignee of this application.

An object of my invention is to provide an improved dynamometer construction for measuring torque.

Another object of my invention is to provide an improved dynamometer for measuring the torque of a machine and for transmitting the power of the machine to a driven load.

Further objects and advantages of my invention will be better understood from the following description referring to the accompanying drawing, and the features of novelty which characterize my invention will be pointed out with particularity in the claims annexed to and forming part of this specification.

In the drawing, Fig. 1 is a side elevational view of an embodiment of my improved dynamometer construction, partly broken away and partly in section to illustrate the details of the torque-transmitting construction; Fig. 2 is an end elevational view of the dynamometer shown in Fig. 1 partly broken away to illustrate the arrangement of the torque-measuring device used in combination with the torque-transmitting mechanism shown in detail in Fig. 1, and looking at Fig. 1 in the direction shown by the arrow; Fig. 3 is a partial plan view of the construction shown in Fig. 2 showing the supporting arrangement and equalizing motor and control; and Fig. 4 is a schematic diagram of the equalizing motor and control.

Referring to the drawing, I have illustrated a dynamometer particularly adapted to measure the torque of a machine having a vertically extending shaft. The torque from a source of mechanical power provided by the vertically extending shaft of a machine is adapted to be measured by coupling such a shaft to a vertically downward extending shaft 10 of the dynamometer, and this shaft is rotatably supported in a bearing housing 11 by a pair of anti-friction ball bearings 12 and 13. Power may be transmitted from the shaft 10 to a load through a second shaft 14 rotatably supported substantially at right angles to the shaft 10 by a pair of anti-friction ball bearings 15 and 16 mounted in the bearing housing 11. A power-transmitting coupling is provided between the shafts 10 and 14 by a set of bevel gears 17 and 18 secured to the shafts 10 and 14, respectively, to transmit power from the vertically extending shaft 10 to the horizontally extending shaft 14, or vice versa. A load is adapted to be placed on the dynamometer through the shaft 14 and the outer end of the shaft 14 is provided with a suitable coupling which includes a yoke 19 connected to a torque-transmitting coupling link 20 through a pivot pin 21 which is pivotally mounted in the yoke 19. This pivot pin 21 forms a pivotal connection with a complementary pivot pin 22 pivotally mounted in a yoke 23 secured to the end of the coupling shaft 20, thereby providing a substantially universal connection between the yoke 19 on the shaft 14 and the coupling shaft 20. The coupling shaft 20 is adapted to provide a driving connection between the shaft 14 and a driven load in order to load the machine connected to the input shaft 10 of the dynamometer, or vice versa. As shown in Fig. 1, the end of the coupling shaft 20 away from the bearing housing 11 also is provided with a yoke 24 secured to the end thereof which pivotally supports a pivot pin 25 having a pivotal connection with a pivot pin 26 pivotally mounted in a complementary yoke 27. Slight variations in the distance between the yokes 23 and 24 resulting from the turning of the housing 11 are compensated for by providing any suitable longitudinally slidable connection between the ends of the coupling shaft and the hub of the yokes 23 and 24, such as longitudinally slidable splined connections which will prevent relative rotation between these parts while permitting relative longitudinal movement therebetween. The yoke 27 is adapted to be secured to any suitable loading device, such as a shaft 28 of an electric generator 29 adapted to be mounted in any conventional manner to prevent rotation thereof around the axis of the gear casing 11 and which can provide a controllable variable load for the machine, or can be used as a motor for driving the dynamometer shaft 10 through the gearing 17 and 18.

In order to measure the torque transmitted by the shaft 10, the bearing housing 11 is rotatably supported on a stationary frame 30 by an upper ball bearing 31 and a lower journal and thrust ball bearing 32 arranged about upper and lower hubs 33 and 34, respectively, of the bearing housing, so that the bearing housing 11 is free to rotate about a vertical axis corresponding to the axis of the shaft 10. With such an arrangement, substantially no torque is transferred from the shaft 10 through the bearings 12 and 13 to the bearing housing 11. However, a consideration of the forces exerted by the shaft 14 on the bearing housing 11 indicates that the bearing housing 11 must provide a resisting torque reaction equal and opposite to the torque transmitted by the shaft 14 in order to prevent the rotation of the shaft 14 about the axis of the shaft 10 or the vertical axis of the bearing housing 11. Thus, if no load is transmitted between the shafts 10 and 14 these two shafts merely rotate freely in their bearings supported by the bearing housing 11. If the load on the shaft 14 were to be considered of such a magnitude as to stall the source of mechanical power connected to the shaft 10, the connecting gears 17 and 18 might be considered as being locked with respect to each other. Under such condition, the shaft 10 would tend to rotate the shaft 14 about the axis of the shaft 10 and, consequently, tend to rotate the bearing housing 11 about the axis of the shaft 10. For any transmitted load on the shaft 14, there would be a corresponding transmitted torque reaction of the shaft 14 on the bearing housing 11 with a complementary resisting torque reaction of the bearing housing 11 on the shaft 14 to prevent the shaft 14 from rotating about the axis of the shaft 10. In order to measure this torque on the bearing housing 11, it is provided with a torque-transmitting arm 35, which is rigidly secured to the side of the housing by bolts 36 and which extends through an opening 37 formed in the stationary frame 30, so as to allow a limited movement of the torque arm 35. A suitable torque or force-measuring device, Fig. 2, is connected to the arm 35 through a linkage which includes a socket 38 on the end of the arm 35 in engagement with a ball 39 formed on the end of a link 40 to provide a ball and socket universal joint therewith. The link 40 is provided at the other end thereof with a socket 41 arranged in engagement with a ball 42 on the end of an arm 43 of a bell crank to provide a universal connection between the link 40 and the bell crank arm 43. The bell crank is pivotally supported by a pivot pin 44 on the stationary frame 30, and another arm 45 of the bell crank is rigidly secured at 46 to a reverse torque mechanism which connects the dynamometer torque arm 35 to a force-measuring or indicating device. The reverse torque mechanism includes a bar 47 to which the end of the crank arm 45 is rigidly secured at 46 and the bar 47 is arranged to engage knife edge pins 48 and 49 of the reverse torque mechanism. If the torque on the bearing housing 11 tends to rotate the bearing housing so as to move the torque arm 35 to the right as viewed in Fig. 2, the bar 47 engages the knife edge 48 and exerts an upward pull on a link 50 which transmits this upward force through a pin 51 which engages the lower end of a slot 52 formed in the link 50. The pin 51 is rigidly secured to a lever 53 which is pivotally supported by a pivot pin 54 on a mounting bracket 55 which is rigidly securedt to the stationary frame 30. The lever arm 53 is provided with a pin 56 rigidly secured to the end thereof opposite the pin 51, and the upward force transmitted to the pin 51 results in a downward force exerted on the pivot pin 56 which engages the lower end of a slot 57 formed in a link 58. The link 58 is connected to a spring balance scale 59 and to a balance mechanism 60 adapted to measure or indicate the force exerted by the torque arm 35 on the vertically extending link 58. The balance mechanism is pivotally suspended at 61 from a supporting bar 62 mounted on vertically extending supports 63 secured to the stationary frame 30 and to a mounting base of the dynamometer. If the torque exerted by the shaft 14 on the bearing housing 11 is such as to tend to cause the torque arm 35 to move to the left as viewed in Fig. 2, the crank arm 45 will exert a downward force on the reverse torque mechanism bar 47 which will engage the knife edge 49 and transmit the downward force to the link 58 and to the spring balance scale 59 and the balance mechanism 60 through the link 58. With this reverse torque mechanism, the bar 47 transmits the force to be measured to one of the knife edges 48 or 49 and becomes disengaged from the other knife edge, depending upon the direction of the force transmitted to the bar 47 from the torque arm 35. Thus, the torque-measuring mechanism exerts a resisting force upon the bearing housing 11 and indicates the torque transmitted by the shaft 10 while preventing the rotation of the bearing housing 11 about its axis and also provides for maintaining the shaft 14 substantially in alignment with the coupling link or shaft 20. However, in order to measure the torque transmitted by the shaft 10, it is necessary that a slight anglar movement be allowed to the bearing housing 11 and, therefore, to the shaft 14, and the universal connections provided by the connections to the coupling link 20 provide for the transmission of torque from the shaft 14 to a driven load without undesirable stress resulting from the slight angular movement of the shaft 14 due to the angular movement of the bearing housing 11.

The arrangement shown can also be used to test shafts extending in other directions from that shown. For instance, the downwardly extending vertical shaft 10 might be arranged to project in an upward direction from the gear casing in order to test a machine having a downwardly extending vertical shaft. A dynamometer construction similar to that shown could also incorporate an arrangement having two horizontally extending shafts substantially at right angles to each other wherein one shaft would be arranged to be connected to the machine to be tested and the other shaft would be arranged to be connected to an absorption machine. With this latter arrangement, Fig. 1 of the drawing would illustrate a plan view of the gear box and its connections. In some instances it might be found desirable to change the ratio of the speeds of the driving and driven equipment; in which case, one of the gears might be made with a different diameter from the other gear, so that a machine adapted to run at a relatively high speed could be tested by an absorption generator turning at a more convenient lower speed.

The measurement of large torques by this type dynamometer will produce relatively large displacements of the arm 35 and may result in the transmission of a restoring force to the bearing housing 11 through the shaft 19 by the coupling link 20 caused by the angular displacement of the end of the shaft 19. In order to minimize or substantially eliminate this restoring force which might introduce inaccuracies in the torque measurements, the entire torque reaction measuring mechanism and the gear housing are mounted on a turntable 64 which is rotatably supported by any suitable bearing arrangement on a stationary platform base 65. An electric motor 66 is arranged to drive the turntable 64 by a worm 67 and a segmental gear 68 so as to maintain the shaft 19 substantially in alignment with the shaft 28 of the driven load. This motor 66 is adapted to be operated in either direction by reversal of its field exciting windings and is energized through a contactor 69 mounted on the arm 35 and which is adapted to contact one or the other of contacts 70 and 71 which are mounted on the stationary base 65. These contacts 70 and 71 are connected in series with field exciting windings 72 and 73, respectively, and are adapted to energize one or the other of these field exciting windings to provide excitation to the armature 74 of the motor 66 in opposite directions and thereby provide a reversing motor control responsive to the direction of rotational or angular displacement of the contactor 69 which operates in response to the rotational displacement of the bearing housing 11. Thus, a clockwise rotation of the bearing housing 11 would cause the contact 69 to contact the stationary contact 70 to energize the motor 66 in such a manner as to cause the turntable 64 to be turned in a counterclockwise direction until contact between the contacts 69 and 70 is broken by the turning of the entire mechanism together with the turntable 64 with a resultant realignment of the coupling 19, the shaft 20, and the shaft 28. Thus, rotational or angular displacement of the bearing housing 11 controls the energization of the motor 66 for rotating the turntable 64 in a direction opposite to the rotation of the bearing housing, and thereby provides for realignment of the shaft 19 and the driven load shaft, under which condition the contactor 69 opens the circuit of the motor 66. Since the torque reaction measuring mechanism is mounted on the same turntable as the bearing housing 11, this rotation of the entire unit in no way affects the correct reading of the torque transmitted through the gear dynamometer, and provides for an accurate measurement of the torque transmitted by the gears by the elimination of any restoring forces due to any misalignment of shafts.

While I have illustrated and described a particular embodiment of my invention, modifications thereof will occur to those skilled in the art. I desire it to be understood, therefore, that my invention is not to be limited to the particular arrangement disclosed, and I intend to cover all such equivalent modifications in the appended claims.

What I claim as new and desire to secure by Letters Patent of the United States is:

1. A dynamometer including a shaft adapted to be connected to a source of mechanical power, means for rotatably supporting said shaft, a second shaft adapted to be connected to a driven load mounted against rotation around the axis of said shaft supporting means, means including said first-mentioned means for rotatably supporting said second shaft substantially at right angles to said first-mentioned shaft, means for providing a driving connection between said two shafts, means for rotatably supporting said shaft supporting means about the axis of said first-mentioned shaft, and means for measuring the resisting torque reaction of said shaft supporting means on said second shaft about the axis of said first-mentioned shaft.

2. A dynamometer including a shaft adapted to be connected to a source of mechanical power, means including a bearing housing for rotatably supporting said shaft, a second shaft adapted to be connected to a driven load by a longitudinally slidable connection, means including said bearing housing for rotatably supporting said second shaft substantially at right angles to said first-mentioned shaft, means for providing a driving connection between said two shafts, means including a bearing for supporting said bearing housing rotatably about the axis of said first-mentioned shaft, and means for measuring the torque reaction of said shafts on said bearing housing about said axis.

3. A dynamometer including a shaft adapted to be connected to a source of mechanical power, means including a bearing housing for rotatably supporting said shaft, a second shaft adapted to be connected to a driven load mounted against rotation around the axis of said bearing housing, means including said bearing housing for rotatably supporting said second shaft substantially at right angles to said first-mentioned shaft, means for providing a driving connection between said two shafts, means for rotatably supporting said bearing housing about the axis of said first-mentioned shaft and substantially at right angles to said second shaft, and means for measuring the torque reaction of said shafts on said bearing housing about said axis.

4. A dynamometer including a shaft adapted to be connected to a source of mechanical power, means including a bearing housing having a bearing arranged to support said shaft rotatably on said housing, a second shaft adapted to be connected to a driven load mounted against rotation around the axis of said bearing housing, means including said bearing housing having a second bearing arranged to support said second shaft rotatably on said housing substantially at right angles to said first-mentioned shaft, means including a set of gears for providing a driving connection between said two shafts, means including a bearing for rotatably supporting said bearing housing about the axis of said first-mentioned shaft, and means for measuring the torque reaction of said second shaft on said bearing housing about the axis of said first-mentioned shaft.

5. A dynamometer including a shaft adapted to be connected to a source of mechanical power, means including a bearing housing having a bearing arranged to support said shaft rotatably on said housing, a second shaft adapted to be connected to a driven load by a longitudinally slidable connection, means including said bearing housing having a second bearing arranged to support said second shaft rotatably on said housing substantially at right angles to said first-mentioned shaft, means including a set of bevel gears for providing a driving connection between said two shafts, means including a bearing for supporting said bearing housing rotatably about the axis of said first-mentioned shaft and substantially at right angles to said second shaft, and means for measuring the torque reaction of said second shaft on said bearing housing about the axis of said housing supporting bearing.

6. A dynamometer including a shaft adapted to be connected to a source of mechanical power, means for rotatably supporting said shaft, a second shaft adapted to be connected to a driven load mounted against rotation around the axis of said shaft supporting means, means including said first-mentioned means for rotatably supporting said second shaft substantially at right angles to said first-mentioned shaft, means for providing a driving connection between said two shafts, frame means for rotatably supporting said shaft supporting means about the axis of the first-mentioned shaft, means for measuring the resisting torque reaction of said shaft supporting means on said second shaft about the axis of said first-mentioned shaft, means for rotatably supporting said frame means and said torque reaction measuring means, and means responsive to rotational displacement of said shaft supporting means for maintaining said second shaft substantially in alignment with said driven load.

7. A dynamometer including a shaft adapted to be connected to a source of mechanical power, means for rotatably supporting said shaft, a second shaft adapted to be connected to a driven load mounted against rotation around the axis of said shaft supporting means, means including said first-mentioned means for rotatably supporting said second shaft substantially at right angles to said first-mentioned shaft, means for providing a driving connection between said two shafts, frame means for rotatably supporting said shaft supporting means about the axis of said first-mentioned shaft, means for measuring the resisting torque reaction of said shaft supporting means on said second shaft about the axis of said first-mentioned shaft, means including a turntable for rotatably supporting said frame means and said torque reaction measuring means, and means responsive to rotational displacement of said shaft supporting means for rotating said turntable for maintaining said second shaft substantially in alignment with said driven load.

8. A dynamometer including a shaft adapted to be connected to a source of mechanical power, means for rotatably supporting said shaft, a second shaft adapted to be connected to a driven load mounted against rotation around the axis of said shaft supporting means, means including said first-mentioned means for rotatably supporting said second shaft substantially at right angles to said first-mentioned shaft, means for providing a driving connection between said two shafts, frame means for rotatably supporting said shaft supporting means about the axis of said first-mentioned shaft, means for measuring the resisting torque reaction of said shaft supporting means on said second shaft about the axis of said first-mentioned shaft, means including a turntable for rotatably supporting said frame means and said torque reaction measuring means, and means responsive to rotational displacement of said shaft supporting means for driving said turntable in the opposite direction to the rotation of said shaft supporting means under the resisting torque reaction for maintaining said second shaft substantially in alignment with said driven load.

9. A dynamometer including a shaft adapted to be connected to a source of mechanical power, means for rotatably supporting said shaft, a second shaft adapted to be connected to a driven load mounted against rotation around the axis of said shaft supporting means, means including said first-mentioned means for rotatably supporting said second shaft substantially at right angles to said first-mentioned shaft, means for providing a driving connection between said two shafts, frame means for rotatably supporting said shaft supporting means about the axis of said first-mentioned shaft, means for measuring the resisting torque reaction of said shaft supporting means on said second shaft about the axis of said first-mentioned shaft, means including a turntable for rotatably supporting said frame means and said torque reaction measuring means, means including a motor for rotatably driving said turntable, and means including a reversing control for controlling said motor for driving said turntable in the opposite direction to the rotation of said shaft supporting means under the resisting torque reaction for maintaining said second shaft substantially in alignment with said driven load.

10. A dynamometer including a shaft adapted to be connected to a source of mechanical power, means including a bearing housing for rotatably supporting said shaft, a second shaft adapted to be connected by a longitudinally slidable connection to a driven load mounted against rotation around the axis of said bearing housing, means including said bearing housing for rotatably supporting said second shaft substantially at right angles to said first-mentioned shaft, means for providing a driving connection between said two shafts, frame means for rotatably supporting said bearing housing about the axis of said first-mentioned shaft, means for measuring the torque reaction of said second shaft on said bearing housing about the axis of said first-mentioned shaft, and means for rotatably supporting said frame means, and said torque reaction measuring means and for maintaining said second shaft substantially in alignment with said driven load.

11. A dynamometer including a shaft adapted to be connected to a source of mechanical power, means including a bearing housing for rotatably supporting said shaft, a second shaft adapted to be connected to a driven load mounted against rotation around the axis of said bearing housing, means including said bearing housing for rotatably supporting said second shaft substantially at right angles to said first-mentioned shaft, means for providing a driving connection between said two shafts, frame means for rotatably supporting said bearing housing about the axis of said first-mentioned shaft, means for measuring the torque reaction of said second shaft on said bearing housing about the axis of said fist-mentioned shaft, means for rotatably supporting said frame means and said torque reaction measuring means, and means for rotating said last-mentioned rotatable supporting means for maintaining said second shaft substantially in alignment with said driven load.

12. A dynamometer including a shaft adapted to be connected to a source of mechanical power, means including a bearing housing for roataably supporting said shaft, a second shaft adapted to be connected to a driven load mounted against rotation around the axis of said bearing housing, means including said bearing housing for rotatably supporting said second shaft substantially at right angles to said first-mentioned shaft, means for providing a driving connection between said two shafts, frame means for rotatably supporting said bearing housing about the axis of said first-mentioned shaft, means for measuring the torque reaction of said second shaft on said bearing housing about the axis of said first-mentioned shaft, means for rotatably supporting said frame means and said torque reaction measuring means, means including a motor for rotating said last-mentioned rotatable supporting means, and reversing motor control means for maintaining said second shaft substantially in alignment with said driven load.

13. A dynamometer including a shaft adapted to be connected to a source of mechanical power, means including a bearing housing for rotatably supporting said shaft, a second shaft adapted to be connected by a longitudinally slidable connection to a driven load mounted against rotation around the axis of said bearing housing, means including said bearing housing for rotatably supporting said second shaft substantially at right angles to said first-mentioned shaft, means for providing a driving connection between said two shafts, frame means for rotatably supporting said bearing housing about the axis of said first-mentioned shaft, means for measuring the torque reaction of said second shaft on said bearing housing about the axis of said first-mentioned shaft, and means for rotatably supporting said frame means and said torque reaction measuring means responsive to rotational displacement of said bearing housing for maintaining said second shaft substantially in alignment with said driven load.

14. A dynamometer including a shaft adapted to be connected to a source of mechanical power, means including a bearing housing for rotatably supporting said shaft, a second shaft adapted to be connected by a longitudinally slidable connection to a driven load mounted against rotation around the axis of said bearing housing, means including said bearing housing for rotatably supporting said second shaft substantially at right angles to said first-mentioned shaft, means for providing a driving connection between said two shafts, frame means for rotatably supporting said bearing housing about the axis of said first-mentioned shaft, means for measuring the torque reaction of said second shaft on said bearing housing about the axis of said first-mentioned shaft, means for rotatably supporting said frame means and said torque reaction measuring means, means including a motor for rotating said last-mentioned rotatable supporting means, and motor control means responsive to rotational displacement of said bearing housing for maintaining said second shaft substantially in alignment with said driven load.

HAROLD M. MARTIN.

REFERENCES CITED

The following references are of record in the file of this patent:

UNITED STATES PATENTS

| Number | Name | Date |
| --- | --- | --- |
| 1,557,956 | Zubaty | Oct. 20, 1925 |
| 1,785,243 | Bewley | Dec. 16, 1930 |
| 1,789,650 | Graham et al. | Jan. 20, 1931 |
| 2,079,751 | Tilden | May 11, 1937 |
| 2,121,623 | Bobek | June 21, 1938 |
| 2,254,575 | Kronquest | Sept. 2, 1941 |
| 2,391,024 | Martin | Dec. 18, 1945 |